(12) United States Patent
Le Anna

(10) Patent No.: US 9,096,160 B2
(45) Date of Patent: Aug. 4, 2015

(54) VEHICLE MOUNTED LIFT ASSEMBLY

(75) Inventor: David L Le Anna, Duck River, TN (US)

(73) Assignee: NEWAGE PRODUCTS, INC., Vaughan, Ontario (CA)

(*) Notice: Subject to any disclaimer, the term of this patent is extended or adjusted under 35 U.S.C. 154(b) by 1572 days.

(21) Appl. No.: 12/423,634

(22) Filed: Apr. 14, 2009

(65) Prior Publication Data
US 2010/0260587 A1    Oct. 14, 2010

(51) Int. Cl.
*B60P 1/48* (2006.01)
*B60R 9/06* (2006.01)
*B60R 9/055* (2006.01)
*B60P 1/44* (2006.01)

(52) U.S. Cl.
CPC . *B60P 1/483* (2013.01); *B60R 9/06* (2013.01); *B60P 1/4414* (2013.01); *B60R 9/055* (2013.01); *Y10S 414/13* (2013.01)

(58) Field of Classification Search
USPC ......... 224/282, 504, 508–510, 519, 521, 924; 280/506; 414/462–466, 469, 495, 498, 414/540, 546–547, 917
See application file for complete search history.

(56) References Cited

U.S. PATENT DOCUMENTS

| | | | |
|---|---|---|---|
| 1,849,855 A * | 3/1932 | Stutsman et al. ............. | 414/463 |
| 3,180,503 A | 4/1965 | Shaw | |
| 3,717,271 A * | 2/1973 | Bargman, Jr. ................. | 414/463 |
| 4,021,070 A * | 5/1977 | Shea ................................ | 296/19 |
| 4,252,492 A | 2/1981 | Scothern | |
| 4,911,318 A * | 3/1990 | Bishop ........................... | 220/1.5 |
| 5,029,740 A * | 7/1991 | Cox ............................... | 224/484 |
| 5,181,822 A * | 1/1993 | Allsop et al. .................. | 414/462 |
| 5,449,100 A * | 9/1995 | Eckhart ......................... | 224/509 |
| 5,456,564 A * | 10/1995 | Bianchini ..................... | 414/462 |
| 5,527,146 A * | 6/1996 | Allsop et al. .................. | 414/462 |
| 5,536,130 A * | 7/1996 | Edensor ........................ | 414/462 |
| 5,547,116 A * | 8/1996 | Eckhart ......................... | 224/509 |
| 5,685,686 A * | 11/1997 | Burns ............................ | 414/462 |
| 6,086,312 A * | 7/2000 | Ziaylek et al. ................ | 414/462 |
| 6,126,223 A | 10/2000 | Rayburn | |
| 6,435,801 B2 * | 8/2002 | Talbott .......................... | 414/462 |
| 6,575,155 B2 | 6/2003 | Brennan | |
| 6,609,481 B1 | 8/2003 | McCarty | |
| 7,396,202 B1 * | 7/2008 | Panzarella et al. ............ | 414/542 |
| 2001/0014272 A1 | 8/2001 | Ochoa | |
| 2007/0280807 A1 | 12/2007 | Threet | |

* cited by examiner

*Primary Examiner* — Gregory Adams

(74) *Attorney, Agent, or Firm* — Howard & Howard Attorneys PLLC

(57) ABSTRACT

A lift assembly connects to a receiver hitch and utilizes a plurality of parallel arms connecting a vertical mounting post to a center support in a lift frame that is raised and lowered by the lift assembly. The lift assembly is configured so that the parallel arms rotate from vertical to an inclined angle as the lift frame is lowered, but the arms do not extend below the horizontal as they extend rearward from the mounting post.

22 Claims, 7 Drawing Sheets

VEHICLE MOUNTED LIFT ASSEMBLY

FIELD OF THE INVENTION

The present invention relates to a lift assembly that may be mounted on a vehicle and particularly to an assembly mounted to a trailer hitch in a fashion providing mechanical advantage to facilitate lifting and lowering of the assembly.

BACKGROUND OF THE INVENTION

Numerous lift assemblies have been designed for attachment to vehicles and most commonly to facilitate loading and unloading from a truck tailgate. Many of the prior art tailgate lift assemblies require integration into the side wall or bed of the vehicle in order to adequately support the lift assembly and weighted load. Powerful hydraulics or lift drives are also required for many of these lift assemblies, if the lifts are intended to be used with substantial loads.

The integration of lift assembly mounts into the side rail or bed of a vehicle is difficult and expensive, both in time and material. Devices have been provided where a mechanism for a tailgate lift utilizes cables, such as in U.S. Pat. No. 4,601,485, screw drives as shown in U.S. Pat. No. 3,180,503; and power from a winch mounted on the vehicle as shown in U.S. Pat. No. 6,609,481.

Some devices have even been designed to mount on a trailer hitch as in U.S. Publication No. 2007/0280807 disclosing a carrier with a screw drive to adjust the height, and U.S. Publication No. 2001/0014272 disclosing a lift connected to its hitch mounted yoke by pairs of parallel support bars. However, this latter publication is inoperable in practice because the lift is allowed to pivot so that the support bars extend both upward and downward from the yoke, causing a situation that requires vertical force to raise and lower the lift.

These and other devices of the prior art fail to be easily integrated with presently existing vehicles and require extensive engineering and manufacturing to mount and operate effectively.

In the prior art there does not exist a simplified unit for providing a vehicle mounted lift assembly, that can be hitch mounted, and providing mechanical advantage so that loads may be lifted manually or with relatively small motors contained within the lift assembly.

BRIEF DESCRIPTION OF THE INVENTION

The present invention resolves at least some of the above disclosed shortcomings of the prior art. A vehicle mounted lift assembly of the present invention may be adapted to easily fasten to a vehicle, and preferably to a hitch assembly, provides mechanical advantage that permits manual lifting or lifting with a motor contained within the lift assembly, of loads up to at least about 500 pounds, utilizes pairs of parallel support arms to connect the vehicle mounting section to the lift frame, and does not permit the pairs of parallel connecting arms to extend from the mounting section at an angle below the vertical. The lift assembly is especially adapted for the carriage of a portable grill apparatus, however, the lift frame is easily adapted to carry conventional loads.

It is, therefore, an object of the present invention to provide a removable vehicle mounted lift assembly that does not require special integration into the bed, side rails or frame of the vehicle. It is a further object of the invention to provide a vehicle mounted lift assembly which may be easily manufactured and that may provide for mechanical advantage in lifting a load of significant weight for carriage by the vehicle.

BRIEF DESCRIPTION OF THE DRAWINGS

These and other objectives of the invention may be more readily seen in the accompanying figures of an exemplary lift assembly in which.

DETAILED DESCRIPTION OF THE INVENTION

Figure 1A:
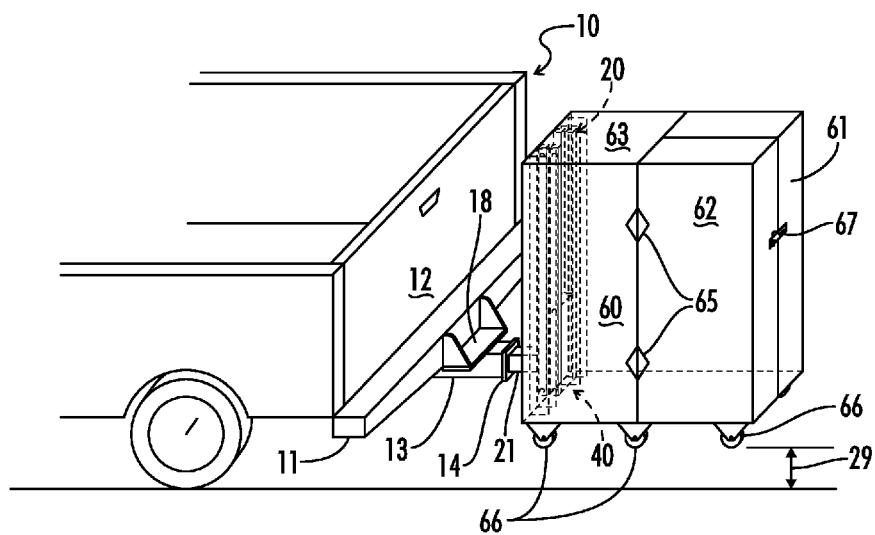
FIG. 1A is a top side perspective view of a vehicle mounted lift assembly according to the invention utilized to carry a portable grill in raised position.
Figure 5:
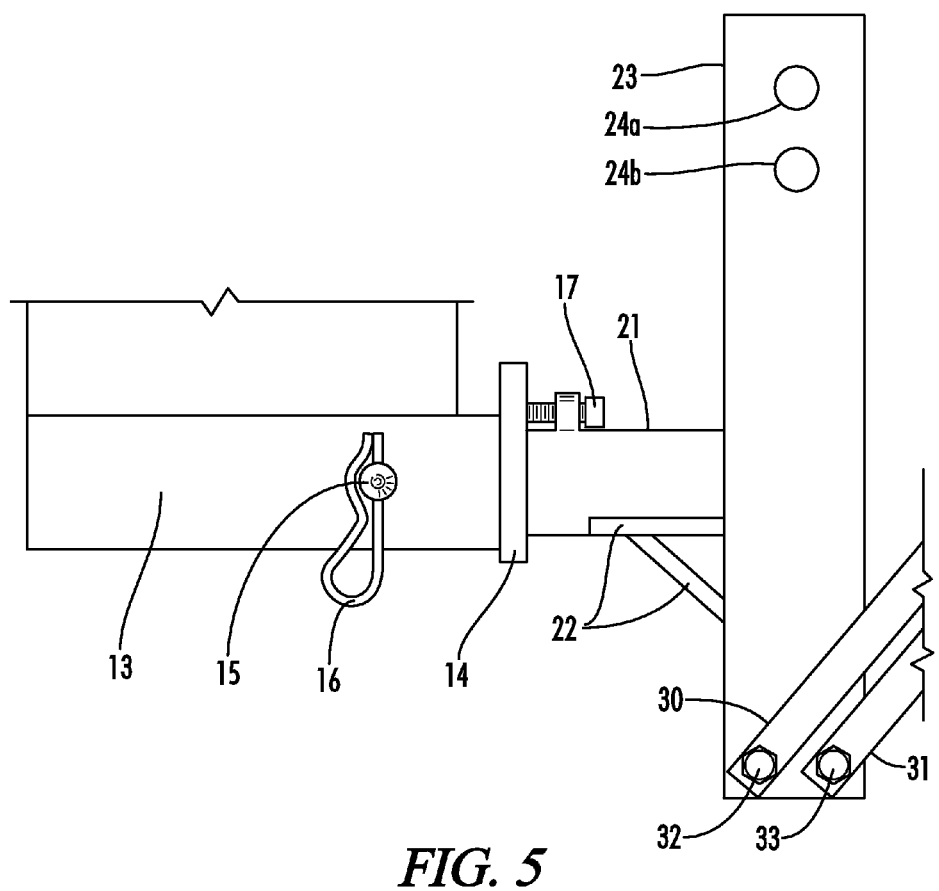
FIG. 5 is a side plan view of the hitch mount of the lift assembly of FIG. 2.

Turning then to FIG. 1A, a representative vehicle 10 with hitch receiver 13 mounted below bumper 11 is shown. The illustrated vehicle has a tailgate 12 and a trailer step 18 above the hitch receiver 13. Preferably the usual trailer hitch is removed from hitch receiver 13 and in this fashion the lift assembly 20 can be readily mounted. In particular, the horizontal attaching member 21 of the mounting portion of the lift assembly is fitted in the hitch receiver 13. As shown in detail in FIG. 5, the hitch receiver 13 preferably has opposed openings and the horizontal attaching member 21 may have similar opposed openings that may be aligned and secured through the use of a hitch cross pin 15. In turn, the hitch cross pin 15 may be secured in place through the use of cross pin retainers 16. To insure that there is no unnecessary movement of the lift assembly 20 when the vehicle 10 is in motion, a tightening mechanism such as a hitch adjusting screw 17 is provided that may be tightened against hitch receiver lip 14 and thereby minimize any movement of the lift assembly 20 and its attendant load when the vehicle 10 is in motion. The horizontal attaching member 21 is secured to vertical mounting post 23 that preferably extends both above and below the attaching number 21 received within the hitch receiver 13. The bottom 26 of the vertical mounting post has a ground clearance that will vary depending upon the vehicle, but should be about one foot or more. The attaching member 21 is preferably attached to the vertical mounting post 23 in a reinforced fashion as through the use of multiple supporting angles 22.

Turning again to FIG. 1A, an exemplary lift frame load for lift assembly 20 is shown in the form of a grill having a center grill unit 60 connected by hinges 65 to folded right grill unit 61 and left folded grill unit 62 and having folding top panels 63. When the grill unit is in its folded position for transport, latch 67 secures the left and right folded grill units 61, 62 from opening. When lowered, the grill units are moveable on wheels 66 so that the grill may be disengaged from vehicle 10 and easily positioned as desired, even if weighting several hundred pounds. Within the lift frame lift assembly 20 is defined as a rear vertical plane by a center support member 40, preferably having a center support channel 41 shown in FIG. 3 and top center support openings 42. The vertical mounting post 23 has a post top 25 and post bottom 26 and at least a pair of bottom post openings 27 (shown in FIG. 7). Extending between bottom post openings 27 and top center support openings 42 are first parallel arm 30 and second parallel arm 31. The use of two parallel arms 30, 31, allows the lift frame to be raised and lowered in a constant vertical orientation without substantial swinging. A first retaining axis in the form of first bolt 32 passes through first bottom arm opening 34 and bottom post opening 27 to secure first parallel arm 30 to the vertical mounting post. Similarly, a second retaining axis in the form of second bolt 33 passes through a second bottom arm opening 35 and bottom post opening 27 to secure the second parallel arm to the vertical mounting post 23. The opposite ends of first and second parallel arms 30, 31 are secured with first and second retaining axes in the form of first and second bolts 43, 44 passing through top center support openings 42 and first arm top opening 38 and second arm top opening 39. In the raised position, it is preferred that the load carried by the lift frame not extend significantly below the bottom of vertical mounting post 23. The bottom of vertical mounting post 23 preferably has about a foot or more of clearance from the ground.

Figure 1B:
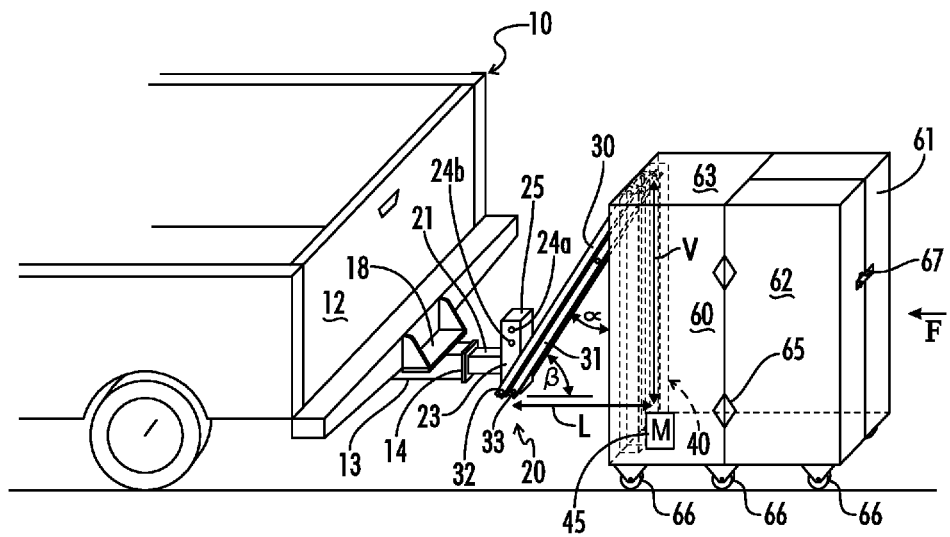
FIG. 1B is a top perspective view of the vehicle mounted lift assembly of FIG. 1A in lowered position.

In order to operate the lift assembly 20 lower the lift frame, the first and second parallel arms 30, 31 are moved from a vertical position in the forward plane of the lift frame where tin the illustrated embodiment, the arm channels 36 receive the vertical mounting post 23, and in turn the first and second parallel arms 30, 31 and mounting post 23 are received within the center support channel 41, to the extended position shown in FIG. 1B. In this lowered position, it can be seen that the wheels 66 of the lift frame are resting on the ground. When the lift assembly 20 is in its fully lowered position, as illustrated in FIG. 1B, the first and second parallel arms 30, 31 extend rearward from the mounting post 23 at a positive acute angle β upward from the horizontal. Similarly, those same first and second parallel arms 30, 31 extend forward from the vertical center support member 40 or forward plane at a positive acute angle α. Because the parallel arms 30, 31 do not extend from the mounting post 23 below the horizontal, pressure exerted on the carried load or lift assembly frame, tending to push the frame towards the rear of vehicle 10, illustrated as force F in FIG. 1B, tends to cause the lift assembly to return to its raised position of FIG. 1A. Therefore, because the parallel arms 30, 31 are not allowed to descend below the horizontal, force only need be applied in the horizontal plane to raise the lift frame and it is not necessary to mount mechanisms on the vehicle to provide vertical lifting force to the lift frame. It will be appreciated that when the angle β remains near 45°, the lift assembly achieves the optimum combination of ease of lifting the lift assembly with horizontal force and lift height. Depending upon the weight of the load carried by the lift frame and whether a motor 45 is available to assist in the raising and lowering of the lift frame, the optimum angle β may vary, typically between about 25° and 60°.

Figure 2:
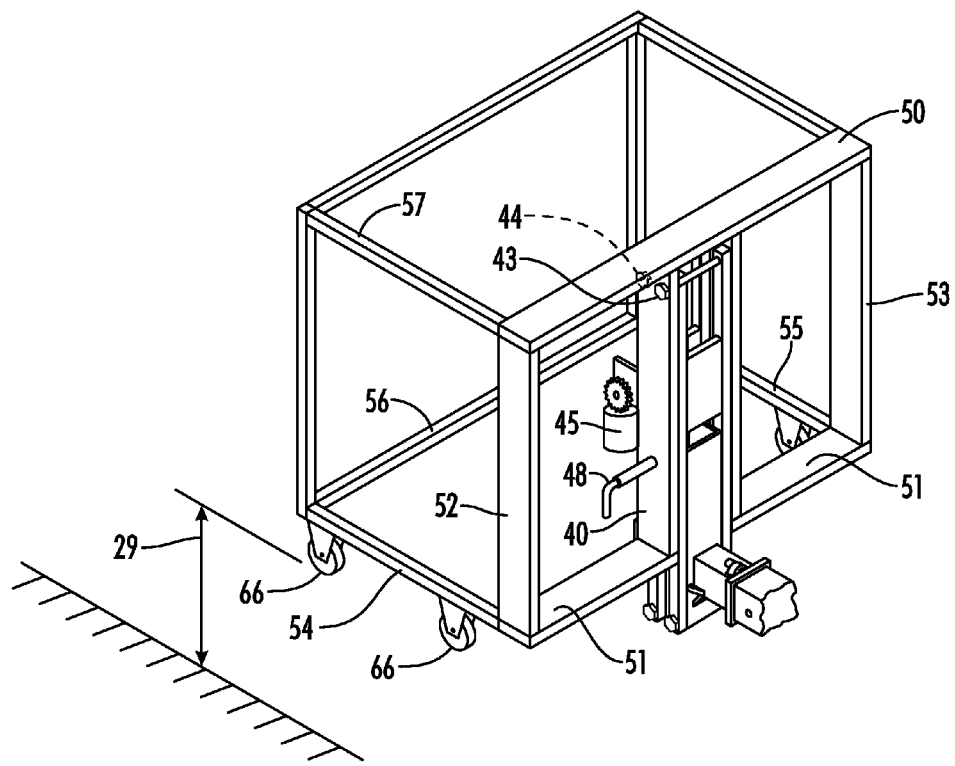
FIG. 2 is a side perspective view of a vehicle mounted lift assembly according to the invention carrying a lift frame in raised position.

FIG. 2 shows an exemplary lift assembly in raised position where the lift assembly 20 includes not only the center support 40, but also a front bottom frame member 51 extending on either side of the center support 40, a top frame member 50 extending to either side of the center support 40, a right forward vertical support 52 connecting the top frame member 50 and bottom frame member 51 and a left forward vertical support 53 again connecting top frame member 50 to bottom frame member 51. Members 50, 51, 52 and 53 define the forward plane of the illustrated lift frame. Alternative constructions of lift frames are possible so that the forward plane does not extend across the entire width of the frame. Extending rearward from the bottom frame member 51 are right bottom horizontal support 54 and left bottom horizontal support 55 and these are connected by rear bottom frame member 56 at their opposite ends. To provide the frame with proper support, the top frame member 50 is preferably connected to the rear bottom frame member 56 either in an angular fashion as illustrated, or by a more diagonal connection.

Figure 3:
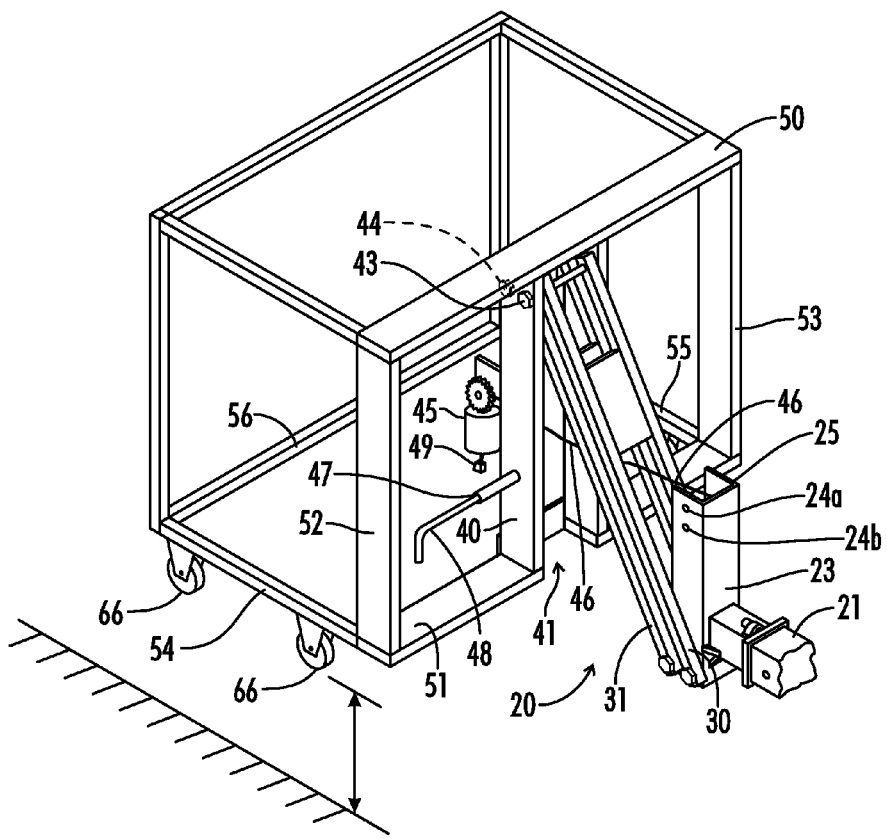
FIG. 3 is a side perspective view of the lift assembly of FIG. 2 in a partially lowered position.
Figure 4:
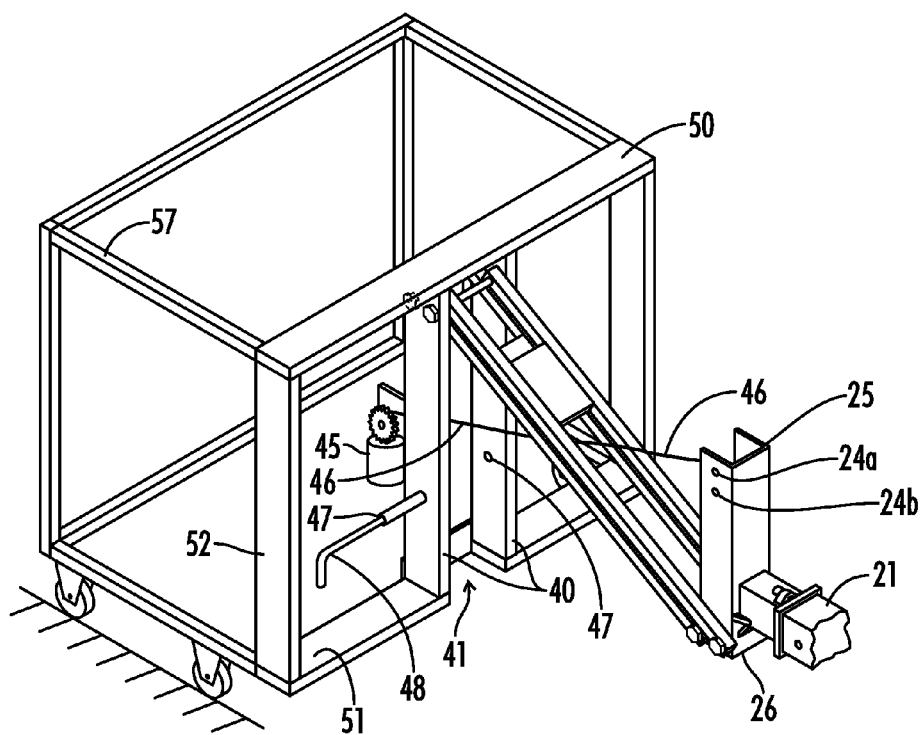
FIG. 4 is a side perspective view of the lift assembly of FIG. 2 in a fully lowered position.

Turning then to FIG. 3, the lift assembly 20 is shown in a partially descended position and the top post openings 24a, 24b of the vertical mounting post 23 are illustrated. In the illustrated embodiment, top post opening 24a is preferably utilized to connect with a cable 46 running to drive assembly of motor 45 to allow for mechanized raising and lowering of the lift frame. The top post opening 24b is preferably aligned with lower center support opening 47 of center support 40 when in the fully raised position. In this fashion, locking pin 48 can be passed through center support opening 47 (shown in FIG. 7) and vertical mounting post opening 24b to securely hold the lift assembly in raised position for transport. Even in the fully lowered position of FIG. 4, the mechanical advantage provided by the arrangement of the lift mechanism is such that the electrical connection 49 for motor 45 can be extended from the electrical connection provided for trailer lights, the motor 45 needing no more power than the typical windshield wiper motor of a passenger vehicle.

Figure 6:
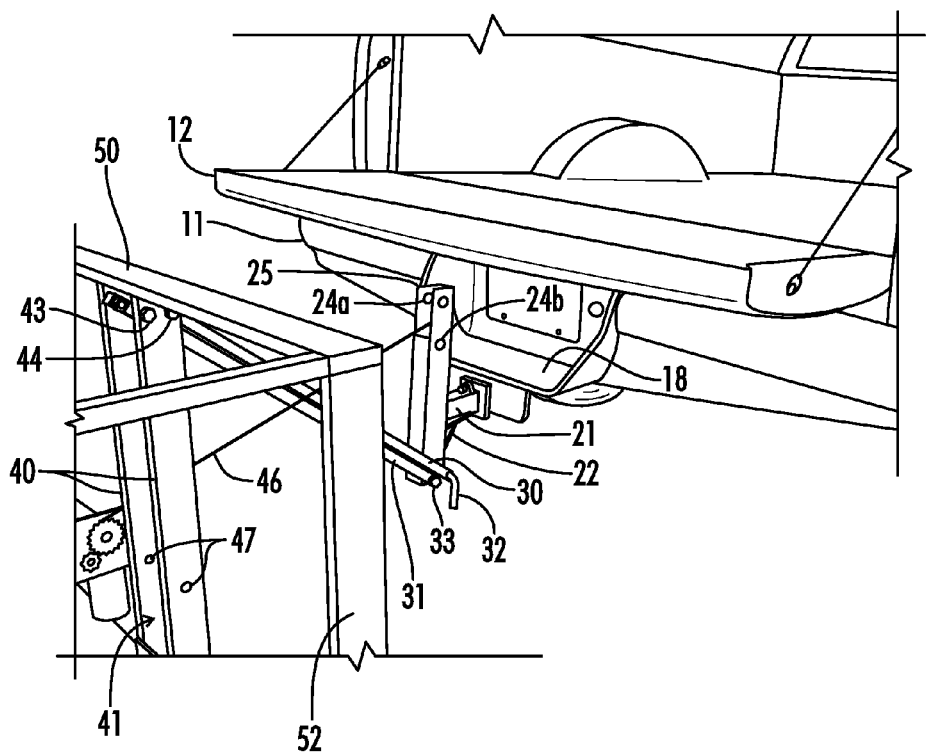
FIG. 6 is a reverse angle view of the lift assembly of FIG. 4 with the vehicle tailgate in its lowered position.
Figure 7:
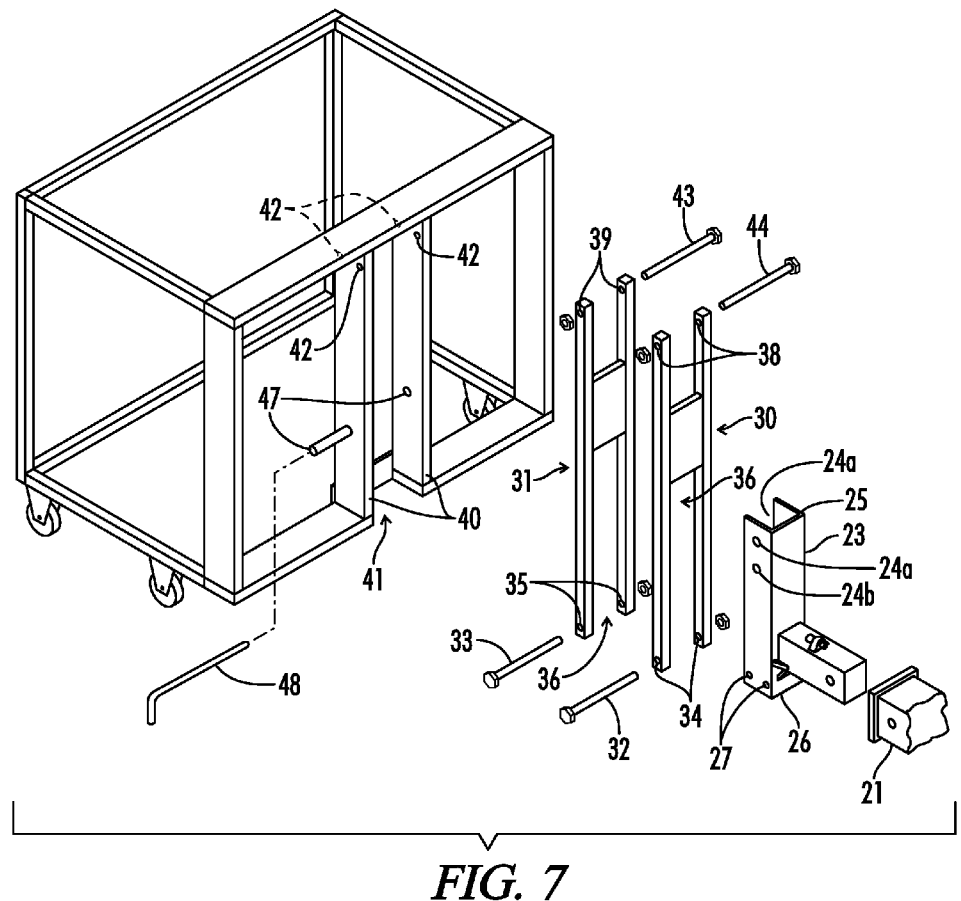
FIG. 7 is an exploded perspective view of an exemplary lift assembly with parallel arm structure and lift frame.

FIG. 6 shows a reverse angle view of the lift assembly in its lowered position and it can be seen that in a preferred embodiment, the post top 25 of vertical mounting post 23 is below the height of an open tailgate 12 when lift assembly 20 is utilized with a pickup truck type vehicle. FIG. 7 shows first and second parallel arms 30, 31 in an exploded view of the lift assembly so that bottom arm openings 34 and top arm openings 38 and channels 36 are clearly seen.

Therefore, in transport mode, the vertical mounting post 23, parallel arms 30, 31 and center support 40, are all preferably aligned in a substantially vertical orientation about one another, or at least within the forward plane of the lift frame, and the bottom frame member 51 of the lift assembly 20 is carried at a safe clearance distance 29 above the ground. When lowered, the center support member 40 is unlocked from the vertical mounting post 23 and the first and second parallel arms are rotated out of vertical into a angular orientation rising at angle β from the attachment of bottom arm openings 34, 35 near post bottom 26 to top arm openings 38, 39 that are fastened at the top center support openings 42 of the lift frame. It will be seen that according to the Pythagorean theorem, the length L of the displacement of center support post 40 from vertical mounting post 23 can be computed according to the formula where the sum of the displacement length squared plus the square of the difference V in vertical height between top center support openings 42 of the lowered lift frame and bottom post openings 27 of the vertical mounting post 23 is equal to the square of the length of the parallel arms, 30, 31 between their opposed retaining axis points. This provides the designers of lift assemblies according to the present invention with guidance in optimizing the lift design for various functions such as the illustrated portable grill carrier, a game lift for hunters, a frame for cargo transport, and other lift assembly uses.

All publications, patent, and patent documents mentioned herein are incorporated by reference herein as though individually incorporated by reference. Although preferred embodiments of the present invention have been disclosed in detail herein, it will be understood that various substitutions and modifications may be made to the disclosed embodiment described herein without departing from the scope and spirit of the present invention as recited in the appended claims.

I claim:

1. A vehicle mounted lift assembly comprising a mounting portion attached to the rear of a vehicle, at least first and second parallel arms extending from the mounting portion to a lift frame, the lift frame further defining a forward plane, wherein the first and second parallel arms extend upward in a nearly vertical orientation within the forward plane when the lift frame is in a raised position and wherein the first and second parallel arms extend rearward outward from the mounting portion in an upward orientation when the lift frame is in a fully lowered position and
said first parallel arm having a first bottom end secured at a first retaining mounting axis on the mounting portion and extending to a first top end secured at a first retaining frame axis on the lift frame, and said second parallel arm having a second bottom end secured at a second retaining mounting axis directly rearward of the first retaining mounting axis on the mounting portion and extending to a second top end secured at a second retaining frame axis rearward of the first retaining frame axis on the lift frame.

2. The lift assembly of claim 1 wherein the mounting portion includes a member attaching to a hitch receiver of the vehicle.

3. The lift assembly of claim 1 wherein the mounting portion includes a vertical post that extends upward only to a point below an open position of a tailgate of the vehicle.

4. The lift assembly of claim 1 wherein the lift frame is raised and lowered in a nearly constant vertical orientation without swinging.

5. The lift assembly of claim 1 wherein the upward orientation of the parallel arms is at least about 25 degrees above the horizontal when the lift frame is in a fully lowered position.

6. The lift assembly of claim 1 wherein the forward plane is defined in part by a top frame member, a bottom frame member and a center support member.

7. The lift assembly of claim 6 wherein in the raised position, the parallel arms are received within a channel of the center support member.

8. The lift assembly of claim 1 wherein a support member of the lift frame is locked to the mounting portion when the lift frame is in its raised position for transportation.

9. The lift assembly of claim 1 further comprising a motor to provide powered raising and lowering of the lift frame.

10. The lift assembly of claim 9 wherein the motor operates to retract and extend a cable connecting the lift frame to the mounting portion.

11. The lift assembly of claim 9 wherein the motor is powered by electrical connection to a lighting circuit of the vehicle.

12. A vehicle mounted lift assembly comprising:
a horizontal attaching member received in a hitch receiver at the rear of a vehicle and secured to a vertical post having an upper and a lower end;
a first arm having a first bottom ends fastened by a first bottom retaining axis on a lower portion of the vertical post and a first opposite ends fastened by a first top retaining axis to a support section of a lift frame;
a second arm having a second bottom end fastened by a second bottom retaining axis on the lower portion of the vertical post rearward of the first bottom retaining axis, and a second opposite end fastened by a second top retaining axis to a support section of the lift frame rearward of the first top retaining axis;
wherein, when the lift frame is in a raised position, the first and second arms extend vertically upward, substantially in alignment with the vertical post and when the lift frame is in its fully lowered position, the first and second arms extend rearward from the vertical post at an upward angle.

13. The lift assembly of claim 12 wherein the lift frame is raised and lowered in a nearly constant vertical orientation without swinging.

14. The lift assembly of claim 12 wherein the upward orientation of the parallel arms is at least about 25 degrees above the horizontal when the lift frame is in a fully lowered position.

15. The lift assembly of claim 12 wherein a forward plane is defined in part by stop frame member, a bottom frame member and a center support member.

16. The lift assembly of claim 15 wherein in the raised position, the arms are received within a channel of the center support member.

17. The lift assembly of claim 12 wherein a support member of the lift frame is locked to the vertical post when the lift frame is in its raised position for transposition.

18. The lift assembly of claim 12 further comprising a motor to provide powered raising and lowering of the lift frame.

19. The lift assembly of claim 18 wherein the motor operates to raise the lift frame by retracting a cable connecting the lift frame to the vertical post and to lower the lift frame by extending said cable.

20. The lift assembly of claim 18 wherein the motor is powered by electrical connection to a lighting circuit of the vehicle.

21. A vehicle mounted lift assembly comprising:
a horizontal attaching member received in a hitch receiver at the rear of a vehicle and secured to an arm mounting member;
a first arm having a first mounting end fastened by a first mounting retaining axis on a portion of the arm mounting member and an opposite first frame end fastened by first frame retaining axis to a support section of a lift frame;
a second arm having a second mounting end fastened by a second mounting retaining axis on a portion of the arm mounting member directly rearward of the first mounting retaining axis, and an opposite second frame end fastened by a second frame retaining axis to the support section of the lift frame rearward of the first frame retaining axis;
wherein, when the lift frame is in a raised position, the first and second arms extend vertically upward, and when the lift frame is in its fully lowered position, the first and second arms extend rearward from the arm mounting member to the support section of the lift frame at an upward angle at least about 25 degrees above the horizontal.

22. The vehicle mounted lift assembly of claim 21 further comprising a hitch cross pin passing through apertures in the hitch receiver aligned with apertures in the horizontal attaching member received therein and a tightening screw adjustable between the horizontal attaching member and the hitch receiver.

* * * * *